(12) United States Patent
Cotter

(10) Patent No.: US 6,170,809 B1
(45) Date of Patent: Jan. 9, 2001

(54) DELAY RETURN GAS SPRING

(75) Inventor: Jonathan P. Cotter, Dearborn, MI (US)

(73) Assignee: Diebolt International, Inc., Plymouth, MI (US)

(*) Notice: Under 35 U.S.C. 154(b), the term of this patent shall be extended for 0 days.

(21) Appl. No.: 09/368,957

(22) Filed: Aug. 5, 1999

(51) Int. Cl.[7] ............................................. F16F 5/00
(52) U.S. Cl. ................................. 267/119; 267/130
(58) Field of Search .............................. 267/64.26, 64.28, 267/119, 130

(56) References Cited

U.S. PATENT DOCUMENTS

| | | | | |
|---|---|---|---|---|
| 3,918,693 | * | 11/1975 | Zahid | 188/287 |
| 4,813,655 | * | 3/1989 | Hennells | 267/119 |
| 5,172,892 | * | 12/1992 | Wallis | 267/119 |
| 5,314,172 | * | 5/1994 | Wallis | 267/130 |
| 5,549,281 | * | 8/1996 | Hall | 267/119 |
| 5,823,513 | | 10/1998 | Stenquist . | |

* cited by examiner

Primary Examiner—Chris Schwartz
(74) Attorney, Agent, or Firm—Reising, Ethington, Barnes, Kisselle, Learman & McCulloc, P.C.

(57) ABSTRACT

A gas spring with a first gas chamber communicated with a second gas chamber through a calibrated orifice to control the rate of return of gas from the first chamber to the second chamber to thereby control the rate at which a piston rod of the cylinder returns to its extended position. Desirably, the rate of return of the piston rod to its extended position can be made slow enough to prevent damage to a die stamped part as the gas spring lifts the part from a lower die half. The gas spring composite shell is preferably formed of and contains materials which are highly thermally conductive and define the return passage to prevent the gas spring from becoming overheated and to permit an increased number of cycles to be completed in a given period of time. Desirably, the gas spring may be completely self contained and utilize only gas to resist the movement of the piston rod to its retracted position, provide a force to move the piston rod to its extended position, and to control the rate of return of the piston rod to its extended position.

19 Claims, 8 Drawing Sheets

DELAY RETURN GAS SPRING

FIELD OF THE INVENTION

This invention relates generally to gas springs and more particularly to a gas spring having a delayed return stroke.

BACKGROUND OF THE INVENTION

A typical gas spring for die stamping applications is constructed with an actuating rod connected to a piston slidably received in a cylinder having a cavity which is precharged to a predetermined pressure with an inert gas such as nitrogen. When the rod and piston are forced into the cavity the gas therein is compressed and when the force applied to the rod is removed, the compressed gas within the cavity immediately forces the piston and rod toward its fully extended position.

In some die stamping applications, gas springs adjacent a lower die half may be used to dislodge the stamped part from a cavity of a lower die half. A problem develops on the return stroke of the upper die half when typical gas springs are used because they immediately and rapidly return to their fully extended position and thereby quickly dislodge and lift the die stamped part from the lower die half. At least with parts having a somewhat large surface area, the rapid return of the gas springs toward their extended positions can cause the die stamped part to buckle or flex and thereby adversely affect the quality of the stamped part.

To delay or control the return of the piston and rod to their extended positions, some prior gas springs have utilized mechanical or electronic controls on the gas springs. Such controls are undesirable and increase the cost and complexity of the gas springs. Another type of gas spring, such as that disclosed in U.S. Pat. No. 5,823,513 uses hydraulic fluid in one chamber, compressed gas in another chamber and a delay valve to cause a momentary dwell at the bottom of the gas spring stroke. This dwell is provided to prevent damage to the press among other reasons. A critical aspect of any delay cylinder, is its ability to withstand and/or dissipate the heat generated in use.

SUMMARY OF THE INVENTION

A gas spring with a first gas chamber communicated with a second gas chamber through a calibrated orifice to control the rate of return of gas from the first chamber to the second chamber to thereby control the rate at which a piston rod of the cylinder returns to its extended position. Desirably, the rate of return of the piston rod to its extended position can be made slow enough to prevent damage to a die stamped part as the gas spring lifts the part from a lower die half. The gas spring cylinder assembly contains components which are highly thermally conductive to prevent the gas spring from becoming overheated and to permit an increased number of cycles to be completed in a given period of time. Desirably, the gas spring may be completely self contained and utilize only gas to resist the movement of the piston rod to its retracted position, provide a force to move the piston rod to its extended position, and to control the rate of return of the piston rod to its extended position.

Objects, features and advantages of this invention include providing a gas spring which has a controlled rate of return to its extended position, does not use any hydraulic fluid or other liquid, is self contained, uses only compressed gas uses highly thermally conductive components to increase the dissipation of heat where it is created and to conduct it away from the gas spring, may have a relatively short cycle time, may be used with a surge tank, does not require any active electronic or manual control, and is of relatively simple design and economical manufacture and assembly, and has a long, useful life in service.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENTS

Figure 1:
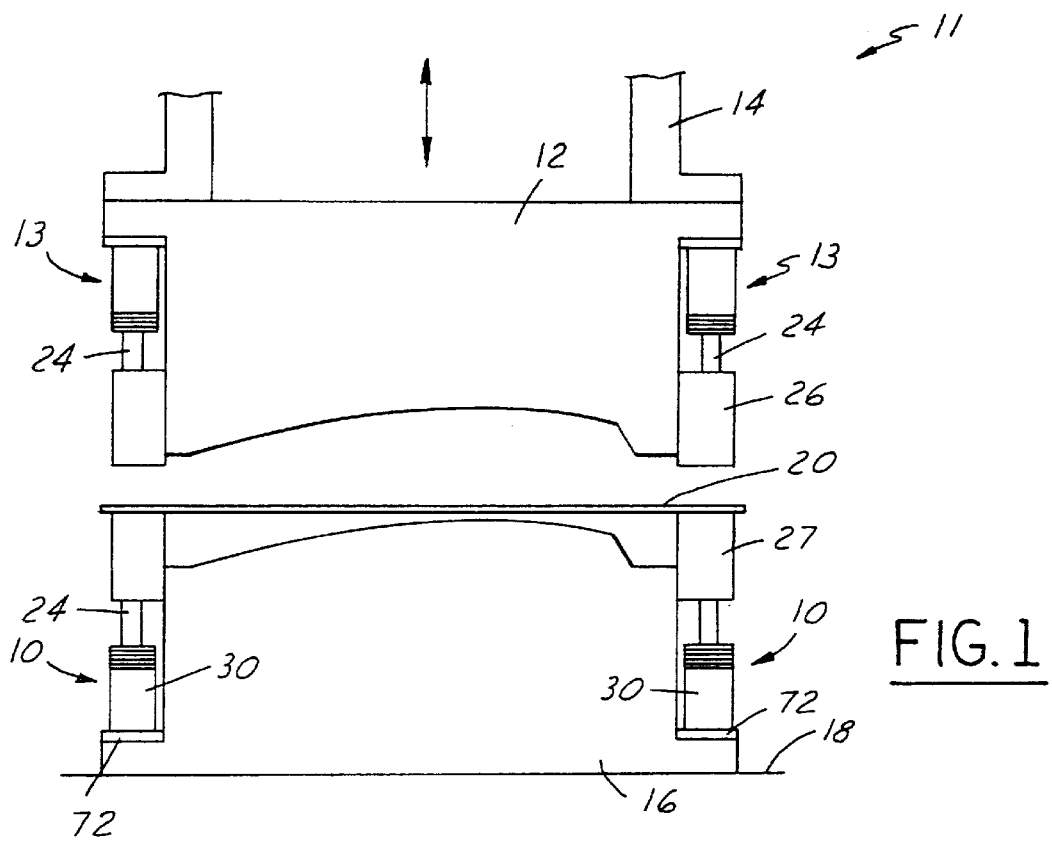
FIG. 1 is a diagrammatic side view of a stamping die set having gas springs embodying the present invention.

Referring in more detail to the drawings, FIG. 1 illustrates a plurality of gas springs 10,13 in a die stamping press 11 having an upper die half 12 carried by an upper platen 14 of the press 11 and movable towards a lower die half 16 fixed to a lower platen 18 of the press 11 to stamp and form a sheet metal blank 20 disposed between the die halves 12, 16. Gas springs 13 are attached to the upper die half 12 and gas springs 10 are attached to the lower die half 16, or the gas springs 10,13 may be carried by the platens 14, 18 of the press 11. Desirably, each gas spring 10,13 has a piston rod 24 extending therefrom and preferably attached to upper and lower draw rings 26, 27 to engage, locate and hold the blank 20 to be stamped relative to the die halves 12, 16. The draw rings 27 of the lower gas springs 10 may also lift the formed part from the lower die half to facilitate removing it and replacing it with a subsequent blank 20 to be formed.

Figure 2:
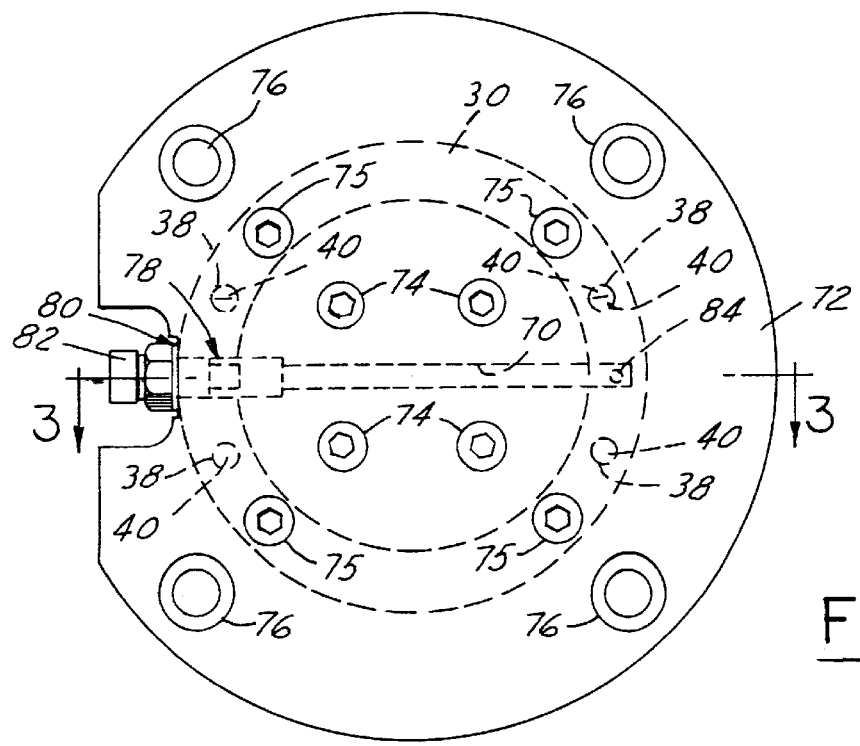
FIG. 2 is a bottom view of a gas spring.
Figure 3:
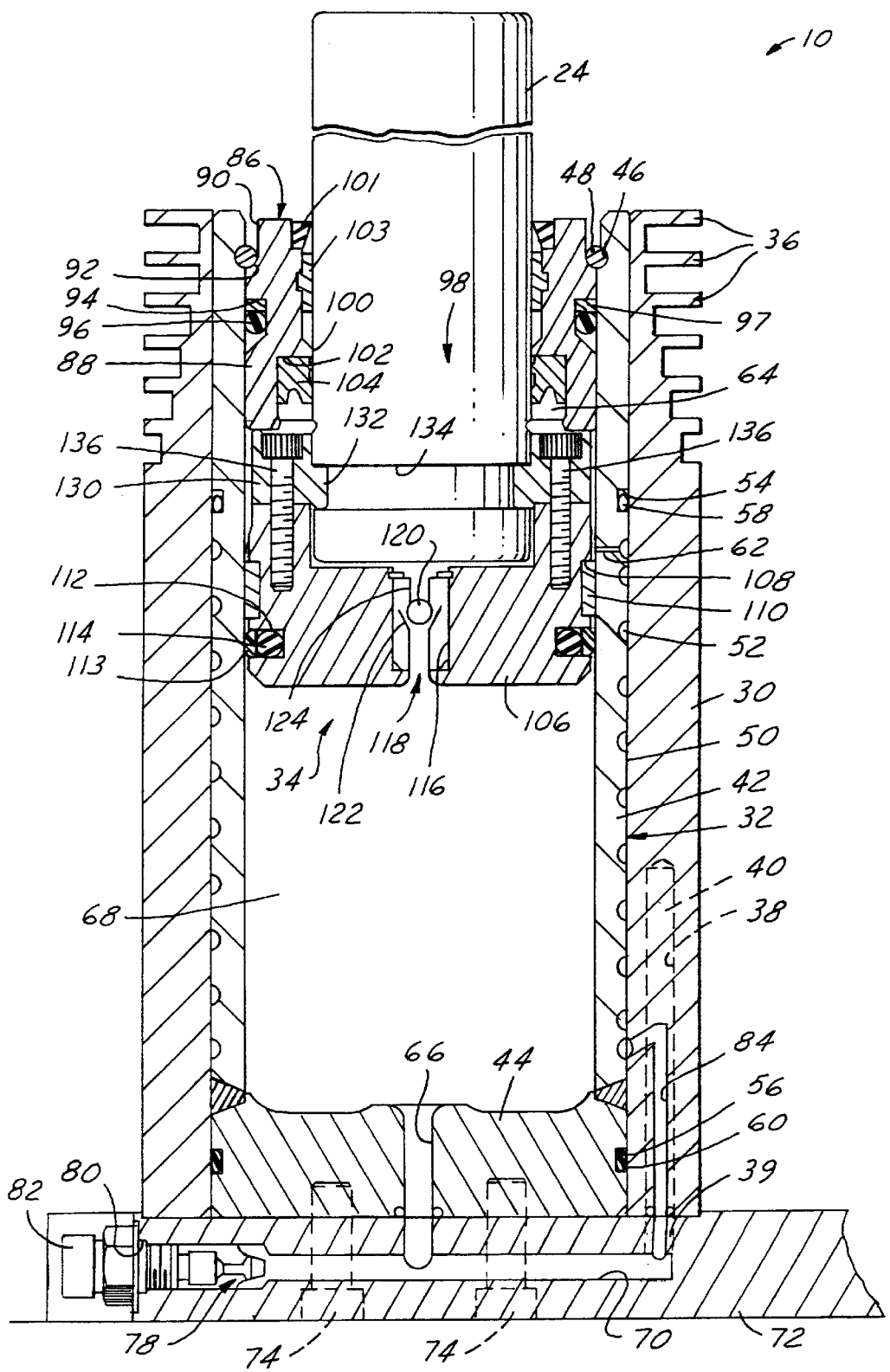
FIG. 3 is a cross-sectional view of the gas spring taken along line 3—3 of FIG. 2 and shown in its extended position.

As shown in FIGS. 2 and 3, the gas springs 10 preferably have an outer generally cylindrical shell 30 surrounding a cylinder body 32 in which a piston rod assembly 34 is reciprocated. The shell 30 is preferably formed of a material having high thermal conductivity, such as copper or aluminum to increase heat transfer away from the gas spring 10. To further increase heat transfer away from the gas spring 10, annular fins 36 may be formed about the upper end of the shell 30. To further improve heat transfer from the gas spring 10, the shell 30 may have a plurality of blind bores 38 which extend into adjoining blind bores 39 in base 72 with a heat pipe 40 in each bore 38, 39. The heat pipes 40 are elongate, generally tubular rods formed of a material having high thermal conductivity, closed at both ends, containing a quantity of a working liquid at a controlled pressure and a central wick. When the liquid at one end of the heat pipe 40 reaches a certain temperature, it evaporates and rises in the heat pipe. The heat pipe 40 is designed and positioned such that a sufficient temperature difference exists between its ends to permit the evaporated working fluid to recondense at the other end to thereby dissipate heat in this phase transformation. The condensed working fluid returns through the wick to begin another cycle. A suitable heat pipe 40 is commercially available from Thermacore, Inc. of Lancaster, PA.

The cylinder body 32 preferably has a generally cylindrical side wall 42 welded to a base 44. The side wall 42 and base 44 are preferably formed of a thermally conductive material, such as steel, which is also strong enough to withstand the pressure exerted on the cylinder body 32 by compressed gas within the gas spring 10 and the forces exerted by the retaining ring 48. An annular groove 46 formed in the interior of the side wall 42 is constructed to receive a retaining ring 48 which retains the piston rod assembly 34 within the cylinder body 32. A generally helical groove formed about the exterior 50 of the side wall 42 defines a fluid passage 52 between the cylinder body 32 and shell 30. Spaced apart annular grooves 54, 56 formed outboard of opposed ends of the fluid passage 52 receive o-rings 58, 60 to provide a fluid tight seal between the shell 30 and cylinder body 32. A restricted passage 62 having a calibrated flow area communicates the fluid passage 52 with a first gas chamber 64 of the cylinder body 32. A bore 66 through the base 44 of the cylinder body 32 communicates a second gas chamber 68 with a passage 70 formed in a mounting plate 72 to which the shell 30 and cylinder body 32 are connected.

The mounting plate 72 is preferably connected to the base 44 of the cylinder body 32 by one or more cap screws 74 received in threaded blind bores in the base and to the shell by cap screws 75. The mounting plate 72 is constructed to be fixed directly to one of the die halves 12, 16 or platens 14, 18 of the press 11 preferably by cap screws 76 (FIG. 2). To permit compressed gas to be delivered into the gas spring 10, a gas filler valve 78 is provided in an inlet 80 of the mounting plate passage 70 which in use is normally closed by a plug 82. A branch passage 84 extends through the mounting plate 72 and into the shell 30 to communicate the fluid passage 52 with the passage 70 in the mounting plate 72. Thus, the passage 70 in the mounting plate 72 communicates with the second gas chamber 68 within the cylinder body 32 and the fluid passage 52 defined between the cylinder body 32 and the shell 30. An O-ring is provided between base 44 and plate 72 to provide a fluid tight seal between them. Another O-ring surrounds passage 84 between the shell 30 and mounting plate 72 to provide a fluid tight seal between them.

An annular bearing and seal assembly 86 is received within the cylinder body 32 and has a housing 88 with a reduced diameter upstream end 90 providing a generally radially outwardly extending shoulder 92 to engage the retaining ring 48 which retains the assembly 86 within the cylinder body 32. The housing 88 has a groove 94 formed about its exterior and constructed to receive a seal ring such as an O-ring 96 to provide a fluid tight seal between the housing 88 and the cylinder body 32. A back-up 97 is preferably provided to ensure the integrity of the seal under high pressures. Such a back-up may be needed for all static seals of the gas springs 10. A throughbore 98 slidably receives the piston rod for reciprocation and defines an annular surface 100 sized to closely receive the piston rod 24 therethrough to prevent extrusion of the rod seal 104 against the piston rod 24 as it reciprocates. A counterbore 102 in the housing 88 receives a seal ring 104 to provide a fluid tight seal between the piston rod 24 and the housing 88. A wiper 101 prevents bearing contamination. An inserted annular plastic bushing 103 guides the piston rod 24.

Figure 4:
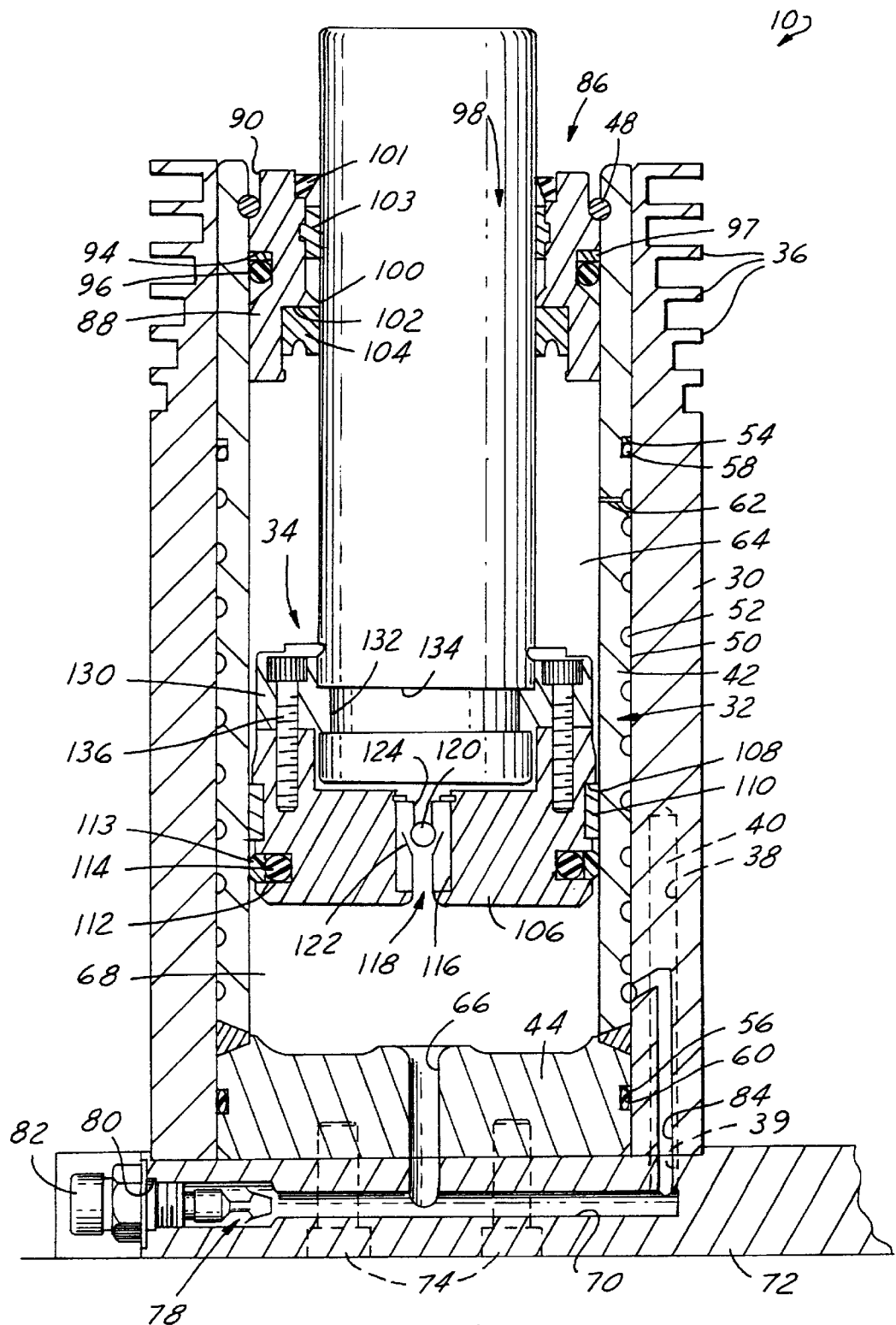
FIG. 4 is a cross-sectional view of the gas spring of FIG. 3 in its retracted position.

The piston and rod assembly 34 is slidably received for reciprocation within the cylinder body 32 between an extended position as shown in FIG. 3 and a retracted position as shown in FIG. 4. The piston 106 has a groove 108 formed therein constructed to receive an annular bearing 110 to guide the piston 106 for reciprocation within the cylinder body 32. A second groove 112 formed in the piston 106 preferably receives a a low friction, low wearing slip ring 113 supported by an O-ring 114 to provide a fluid tight seal between the exterior of the piston 106 and the interior of the side wall 42. A central passage 116 through the piston 106 receives a valve 118 which permits a substantially free flow of compressed gas from the second gas chamber 68 to the first gas chamber 64 and provides at least a partial restriction to the flow of gas from the first gas chamber 64 to the second gas chamber 68. Preferably, the valve 118 is a check valve which substantially prevents fluid flow from the first gas chamber 64 to the second gas chamber 68. The valve 118 has a valve head 120 yieldably biased onto a valve seat 122 such as by a spring 124.

To connect the piston 106 and piston rod 24, a split ring retainer 130 has a generally radially inwardly extending rib 132 constructed to be received in an annular groove 134 in the piston rod 24 and is fixed to the piston 106 by one or more cap screws 136 extending into threaded blind bores in the piston 106. Travel of the piston rod assembly 34 to its extended position with the piston rod 24 extending out of the cylinder body 32 is restricted by engagement of the split ring retainer 130 with the housing 88 of the bearing and seal assembly 86.

Operation

Figure 5:
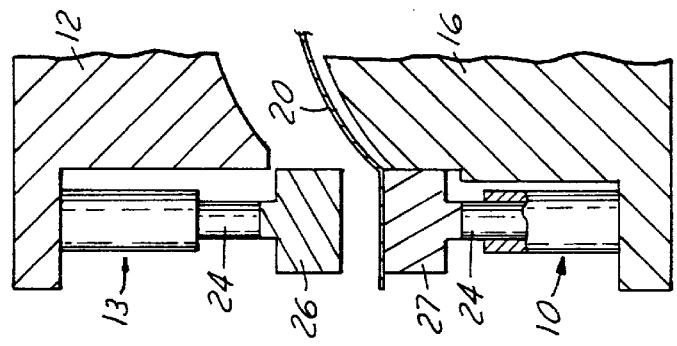
FIGS. 5–9 are fragmentary, diagrammatic views of the press and a pair of gas springs of FIG. 2 shown in 5 different positions throughout a cycle to stamp a part.
Figure 6:
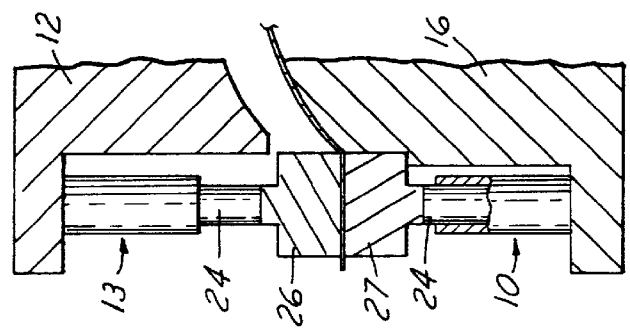
Figure 7:
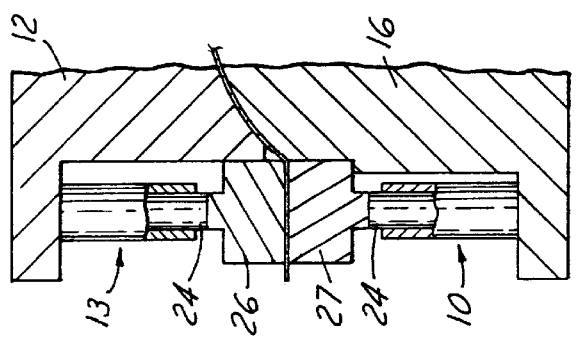
Figure 8:
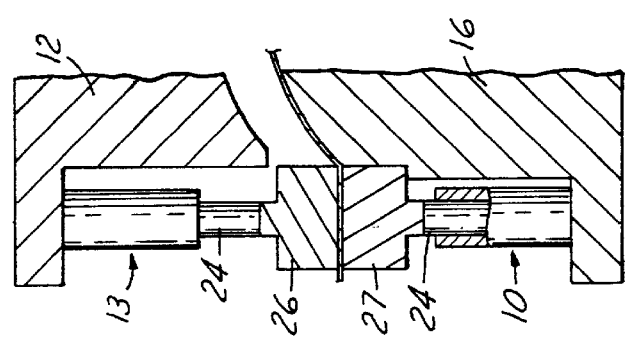
Figure 9:
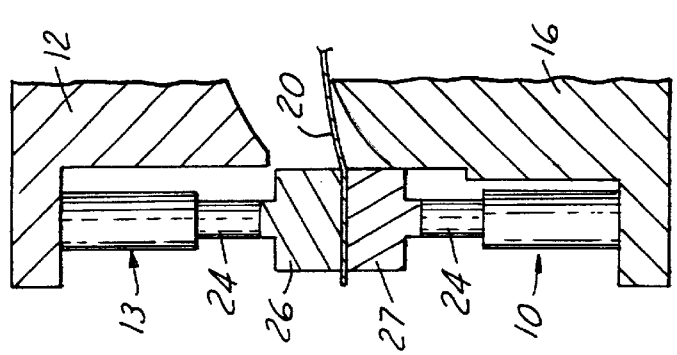

A specific, but not exclusive application of this gas spring is the double draw ring inverted stretch draw shown in FIGS. 1 and 5—9. To form a sheet metal blank 20 received between the upper and lower die halves 12, 16, the upper die half 12 is advanced by the upper press platen 14 towards the lower die half 16 to form the blank 20 between them. As shown in FIG. 5, gas springs 13,10 carried by the upper and lower die halves 12, 16 have draw rings 26, 27 thereon which engage the blank 20 to locate and hold it as the die halves 12, 16 form it. After engagement of the draw rings 26, 27 with the blank 20, further advancement of the upper press platen 14 displaces the piston rod 24 of the gas spring 10 on the lower die half 16 until it "bottoms out" or reaches its fully retracted position, as shown in FIG. 6. Still further advancement of the upper press platen 14, as shown in FIG. 7, moves the piston rod 24 of the gas spring 13 of the upper platen 14 to its fully retracted position and causes the upper press platen 14 to engage and form the blank 20. As shown in FIG. 8, as the upper press platen 14 is retracted, the piston rod 24 of the gas spring 13 on the upper press platen 14 returns to its extended position and eventually, its draw ring 26 disengages from the lower draw ring 27 to permit the gas spring 24 on the lower press platen 18 to return to its extended position (FIG. 9). Desirably, the gas springs 10 carried by the lower die half 16 engage the blank 20 after it has been formed to lift it from the lower die half 16 so that it may be removed from the press 11 and a subsequent blank to be formed inserted into the press 11.

To provide a more controlled return stroke of the piston rods 24 to more gently lift the formed blank 20 from the lower die half 16, the gas springs 10 are constructed such that pressurized gas in the second gas chamber 68 flows freely through the valve 118 into the first gas chamber 64 as the piston rod 24 is moved to its retracted position and as the piston rod moves to its extended position, the flow of gas from the first gas chamber 64 is restricted by orifice 62 to control the rate of return of the piston rod 24 to its extended position.

To accomplish this, the valve 1 18 carried by the piston 106 is preferably a check valve which readily opens as the piston rod assembly 34 is moved to its retracted position to substantially freely permit the gas in the second gas chamber 68 to flow into the first gas chamber 64. On the return stroke, the valve 118 closes to prevent the flow of gas through it from the first gas chamber 64 to the second gas chamber 68. Thus, the gas in the first gas chamber 64 is compressed as the piston rod assembly 34 returns to its extended position and may only escape through the orifice 62 to control the gas flow rate out of the first gas chamber 64 and decrease the rate of return of the piston rod assembly 34 to its extended position. The gas which flows at a controlled rate out of the first gas chamber 64 through the calibrated orifice 62 flows into the fluid passage 52, branch passage 84, passage 70 through the mounting plate 72, the bore 66 through the base 44 and into the second gas chamber 68 to decrease the pressure within the first gas chamber 64 and return the gas to the second gas chamber 68 to ensure that the piston rod assembly 34 returns to its extended position.

Notably, at or near the bottom of the stroke of the piston rod assembly 34 from its extended to its retracted position, when the gas in the second chamber 68 is not being further compressed, the pressure in the first and second gas chambers 64, 68 will become substantially equal and the valve 118 will close. At this time, a significant force differential exists across the piston 106, due to the significant difference in surface area of the piston 106 acted on by gas in the first gas chamber 64 compared to the second gas chamber 68. Thus, at least initially after the piston 106 reaches its fully retracted position, a significant force exists tending to return the piston rod assembly 34 to its extended position. As the piston rod assembly 34 moves toward its extended position, the volume of the second gas chamber 68 increases and the pressure therein decreases. In one embodiment, after less than 10% of the return stroke, the force tending to return the piston rod assembly 34 to its extended position decreases dramatically and thereafter, the net force on the piston rod assembly 34 may be just great enough to ensure that the assembly 34 returns to its fully extended position. Of course, the gas flow through the calibrated orifice 62 controls the pressure in both the first and second gas chambers 64, 68 and hence, the forces acting on the assembly 34.

The compression of the gas and subsequent throttling through orifice 62 in the gas spring 10 generates significant heat, which if not adequately dissipated, will cause the temperature of the various seals within the gas spring 10 to exceed a maximum allowable temperature above which they deteriorate or degrade and cease to provide an adequate seal causing failure of the gas spring. Thus, a number of features are preferably designed into the gas spring 10 to increase dissipation of heat from the gas spring 10 to thereby reduce the maximum temperature of the gas spring in use and permit an increased cycle rate of the gas spring.

Among the features designed to dissipate heat, the helical fluid passage 52 increases the surface area of contact between the heated compressed gas and both the cylinder body 32 and especially the exterior shell 30 which is formed of a material having high thermal conductivity to conduct heat away from the gas in the fluid passage 52. To increase the heat dissipated from the shell 30, the cooling fins 36 are provided adjacent its upper end and the shell 30 may be received within a pocket to expose its exterior surface to ambient air so that at least some heat may be removed by convection, to the air surrounding the shell 30. The mounting plate 72 is also formed of a material having high thermal conductivity to remove heat from the cylinder body 32 and shell 30 by conduction. Further, the mounting plate 72 is bolted directly to the lower die half 16 or lower platen 18 of the press 11 which acts as a heat sink to greatly improve the conduction of heat away from the gas spring 10. Still further, the heat pipes 40 received within the bores 38 in the shell 30 take advantage of the dissipation of heat which occurs during the phase change of the fluid within the heat pipes 40 as it is evaporated by the heat within the shell 30 at one end and condensed at the other end back to liquid form. Each of these features is designed to remove heat from the gas spring 10 to limit its maximum temperature and to increase the cycle rate of the gas spring 10.

Second Embodiment

Figure 10:
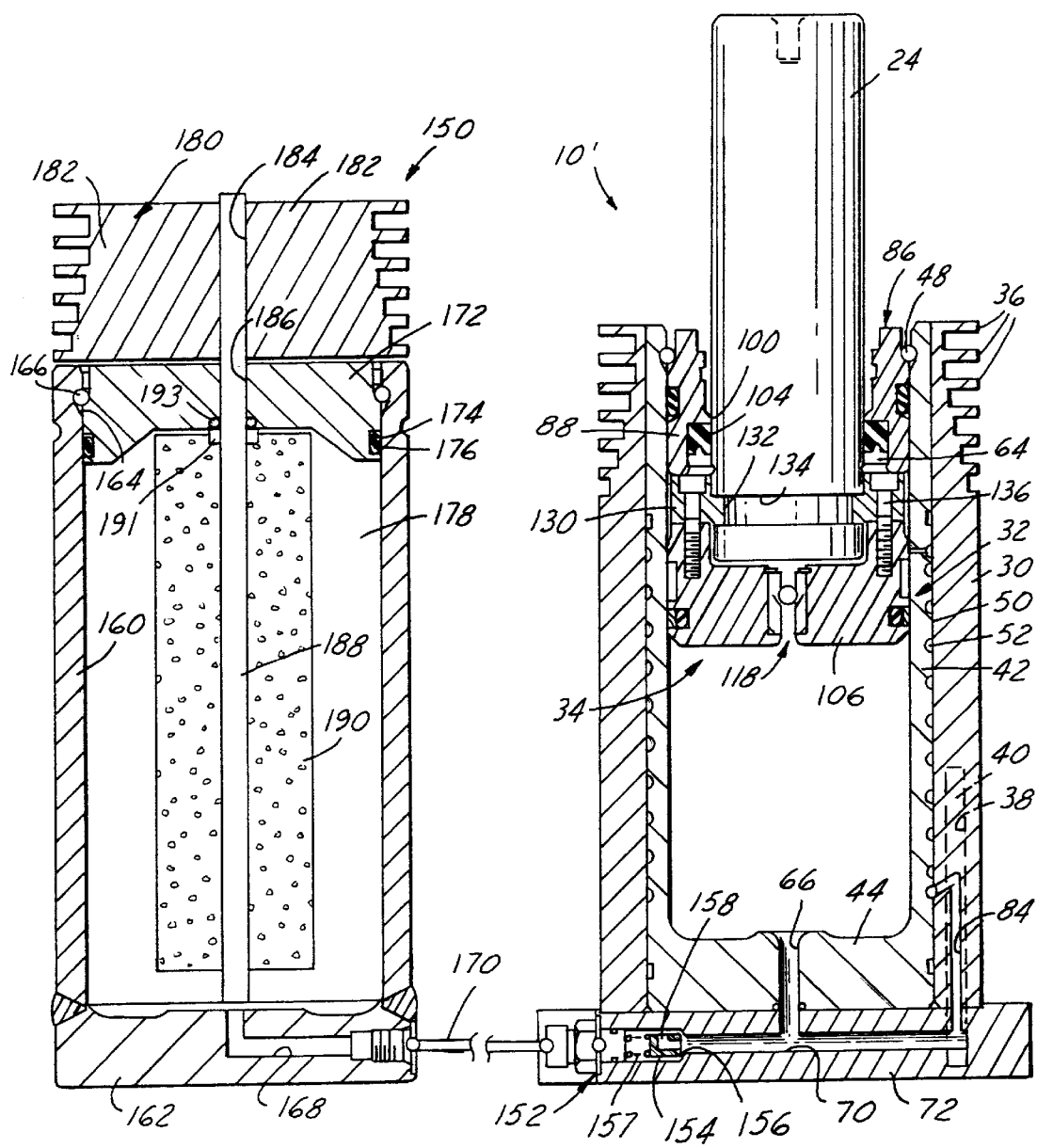
FIG. 10 is a cross-sectional view of an alternate embodiment of a gas spring with a surge tank.

To improve the cooling of a gas spring 10', as shown in FIG. 10, a reservoir or surge tank 150 is provided to cool compressed gas therein which is exchangeable with the compressed gas in the gas spring 10' to supplement and increase the cooling of the gas spring. The gas spring 10' itself may be constructed substantially the same as in the first embodiment and hence, to the extent that it is the same as the first embodiment, it will not be described further.

To control the flow of compressed gas between the gas spring 10' and surge tank 150, a flow control valve 152 may be received in the passage 70 of the mounting plate 72 instead of the gas filler valve 78 of the previous embodiment. The flow control valve 152 preferably permits a relatively free flow of gas from the gas spring 10' to the surge tank 150 and permits a restricted flow of gas from the surge tank 150 back to the gas spring 10'. To accomplish this, as shown in FIG. 10, the valve 152 may have a valve head 154 yieldably biased onto a valve seat 156 by a spring 157 with a small orifice 158 through the valve head 154 to permit fluid flow therethrough even when the valve head 154 is engaged with the valve seat 156. Gas flow from the gas spring 10' to the surge tank 152 displaces the valve head 154 from the valve seat 156 and the gas may flow relatively freely past the valve 152. Gas flow in the opposite direction, from the surge tank 150 to the gas spring 10', causes the valve head 154 to bear on the valve seat 156 such that fluid flow in this direction occurs only through the orifice 158 and thus, at a controlled rate.

The surge tank 150 preferably has a generally tubular sidewall 160 welded to a lower end cap 162 to define an open ended cylinder. An internal groove 164 in the sidewall 160 receives a retaining ring 166 in assembly. The lower end cap 162 has a through passage 168 communicating with the passage 70 of the gas spring mounting plate 72 through the valve 152 and a conduit 170. An upper end cap 172 is releasably retained in the sidewall 160 by the retaining ring 166 and has an annular groove 174 with a seal ring 176 therein providing a fluid tight seal between the upper end cap 172 and sidewall 160. A gas chamber 178 is defined between the upper end cap 172, sidewall 160 and lower end cap 162 and is in communication with the passage 168 and constructed to contain a supply of compressed gas interchangeable with the gas in the gas spring 10' to reduce the pressure increase and to enhance the cooling of the gas spring 10'.

A copper or aluminum heat sink 180 is preferably attached to the upper end of the surge tank 150 and has a radial array of fins 182 exposed to ambient air to improve the dissipation of heat from the surge tank 150. The heat sink 180 and upper end cap 172 preferably have central throughbores 184, 186, respectively, in which an elongate heat pipe 188 is press-fit. The heat pipe 188 is preferably of similar construction as the heat pipes 40 of the gas spring 10 and contains a fluid at a controlled pressure designed to evaporate above a predetermined temperature, with the evaporated fluid moving in the heat pipe 188 towards the heat sink 130 and thereafter condensing when the temperature of the evaporated fluid drops below the predetermined temperature to dissipate heat due to the phase change of the fluid. Thus, the heat released as the fluid recondenses is dissipated into the heat sink 180 to remove heat from the surge tank 150. The recondensed fluid returns in the heat pipe 188 to begin the process again through a wick structure (not shown) within the interior of the heat pipe 188.

The surge tank may also contain a generally cylindrical heat collector 190 formed of a highly thermally conductive material, such as aluminum or copper, which preferably is generally cellular or foamed and has a plurality of cavities which may be permeated by the compressed gas to increase the heat transfer from the gas to the heat collector 190. A press-fit, brazed or soldered portion connects the heat collector 190 to the heat pipe 188 with the increased temperature of the heat collector 190 transferred to the heat pipe 188 which in turn transfers the heat to the heat sink 180. A brazed on ring 191 or formed shoulder retains the heat pipe below a seal 193 that contains the pressure in chamber 178.

During the return stroke of the gas spring 10' as its piston rod assembly 34 returns to its extended position, the volume of the second gas chamber 68 increases and gas in the first gas chamber 64 may return to the second gas chamber 68 through the orifice 62 and fluid passage 52, and cooler gas from the surge tank 150 may also return to the gas spring 10' through the interconnecting conduit 170 and the passage 70 in the mounting plate 72. The cooler gas from the surge tank 150 supplements the cooling of the gas spring 10' to reduce its temperature in use and permit an increased cycle rate of the gas spring 10'.

Third Embodiment

Figure 11:
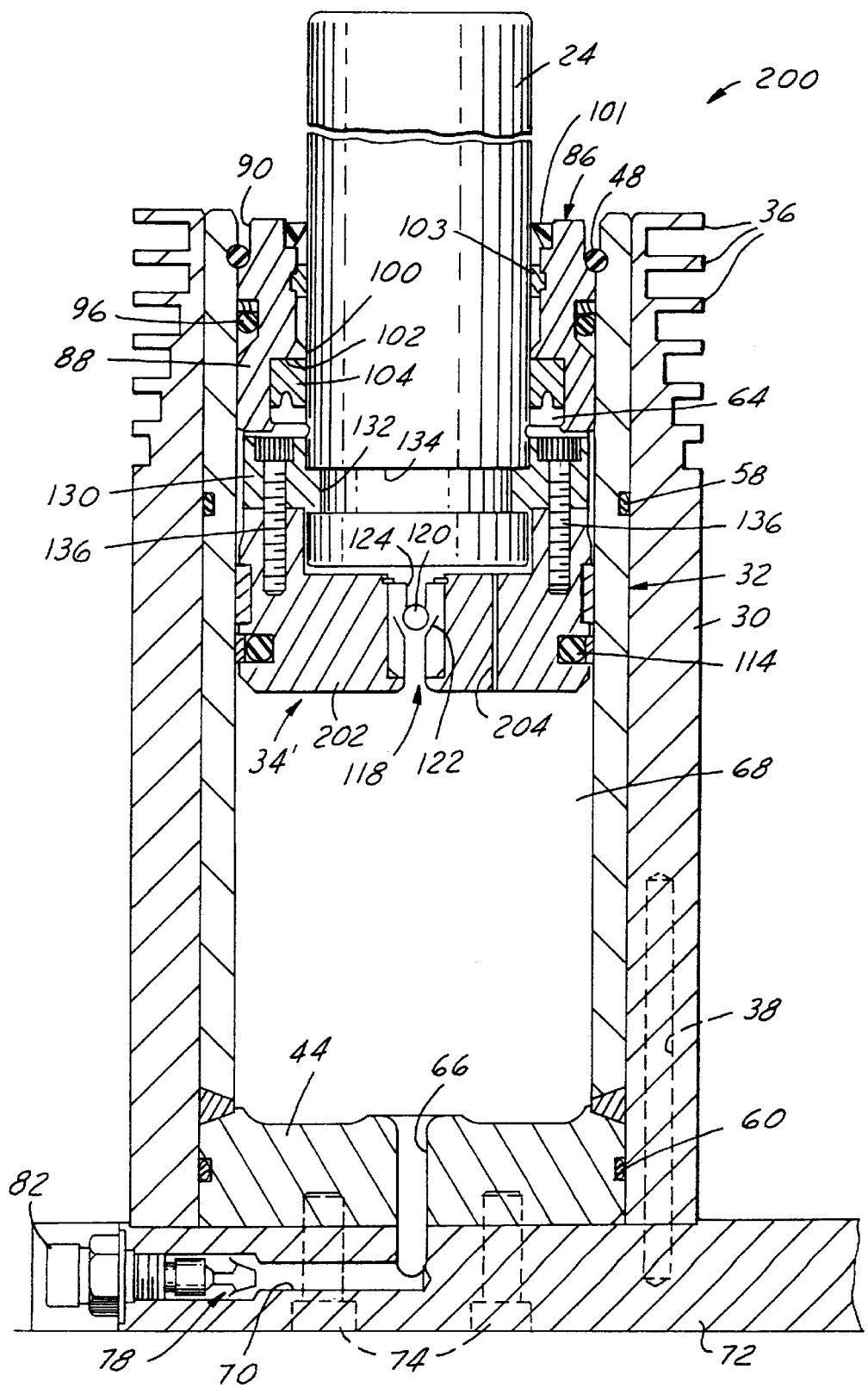
FIG. 11 is a cross-sectional view of a modified gas spring embodying the present invention.

As shown in FIG. 11, a gas spring 200 according to a third embodiment of the present invention has a piston rod assembly 34' with a modified piston 202 having a calibrated passage 204 therethrough to provide a controlled flow of gas between the first gas chamber 64 and second gas chamber 68. The valve 118 preferably functions the same way as in the first embodiment to permit the flow of gas from the second gas chamber 68 to the first gas chamber 64 and prevent the reverse flow from the first gas chamber 64 to the second gas chamber 68. In this embodiment, the passage 52 and branch passage 84 are not needed. Other than these exceptions, the gas spring 200 is preferably formed substantially the same as the first embodiment gas spring 10 and thus, similar parts have been given the same reference numbers and will not be described again.

As the piston rod assembly 34' moves from its extended position to its retracted position, the valve 118 opens and gas in the second gas chamber 68 may flow relatively freely into the first gas chamber 64. On the return stroke, as the piston rod assembly 34' returns to its extended position, the valve 118 prevents the flow of gas through it from the first gas chamber 64 to the second gas chamber 68 and such flow occurs only through passage 204. The relatively small flow area through passage 204 provides a restricted or controlled flow of gas out of the first gas chamber to control the rate of travel of the piston rod assembly 34' toward its extended position.

Fourth Embodiment

Figure 12:
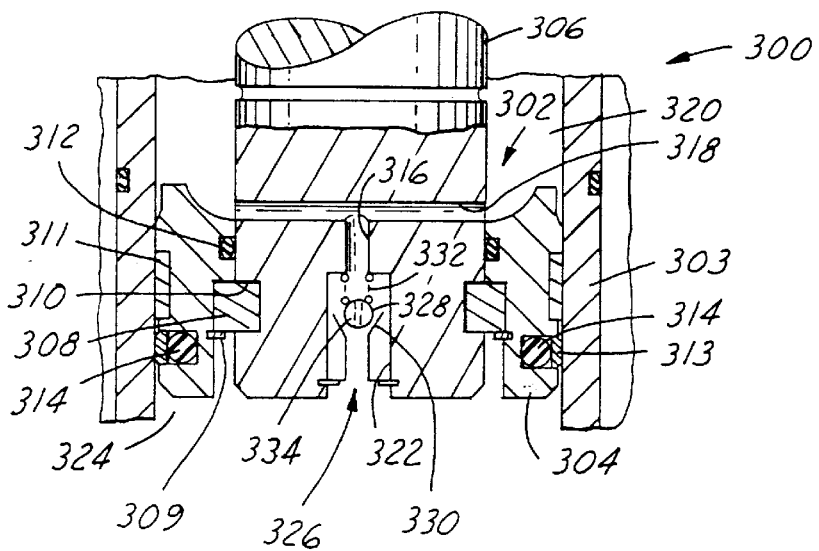
FIG. 12 is a fragmentary sectional view of another modified gas spring embodying the present invention.

As shown in FIG. 12, a gas spring 300 may have a modified piston rod assembly 302 received in a cylinder body 303 and having an annular piston 304 connected to a piston rod 306 by a split retaining ring 308 received in a groove 310 of piston rod 306 and further retained by a small retaining ring 309. The piston rod assembly 302 is retained in the cylinder body by engagement of the piston 304 with a seal and bearing assembly (not shown) such as the assembly 86 shown in the previous embodiments. The piston preferably carries a bearing 311 to guide the piston as it is reciprocated in body 303 and O-ring 312, low friction slip ring 313 and O-ring 314 to provide a seal between the piston 304 and both the piston rod 306 and body 303.

A blind bore 316 in the piston rod 306 communicates with a transverse passage 318 extending through the piston rod 306 and opening to a first gas chamber 320. A counterbore 322 opens to bore 316 and a second gas chamber 324.

A valve 326 received in counterbore 322 has a valve head 328 yieldably biased onto a valve seat 330, such as by a spring 332, to control fluid flow through the valve 326. A passage 334 through the valve head 328 permits a controlled fluid flow through the valve 326 even when the valve head 328 is engaged with the valve seat 330.

When the piston rod assembly 302 moves from an extended position to a retracted position, the volume of the second gas chamber 324 decreases and the valve head 328 is displaced from the valve seat 330 so that gas flows relatively freely from the second gas chamber 324 through the valve 326 and into the first gas chamber 320. On the return stroke, as the piston rod assembly 302 moves back toward its extended position, the volume of the first gas chamber 320 decreases, the valve head 328 is moved into engagement with the valve seat 330 and the flow of gas from the first gas chamber 320 to the second gas chamber 324 occurs only through the passage 334 through the valve head 328 at a restricted rate controlled by the flow area of the passage 334.

The controlled discharge of gas from the first gas chamber 320 provides a controlled rate of return of the piston rod assembly 302 in generally the same manner as described for gas spring 10. The heat generated in use of this relatively simple gas spring 300 may severely limit its cycle rate unless some external cooling source, such as a circulating liquid coolant, is provided or other cooling or heat dissipation device(s) provided. The piston rod assembly 302 may be more compact than assembly 34 of gas spring 10. The piston rod assembly 302 may be fitted with a valve such as valve 118 of gas spring 10 to be used within a gas spring otherwise constructed as in the first embodiment gas spring 10 if desired.

Fifth Embodiment

Figure 13:
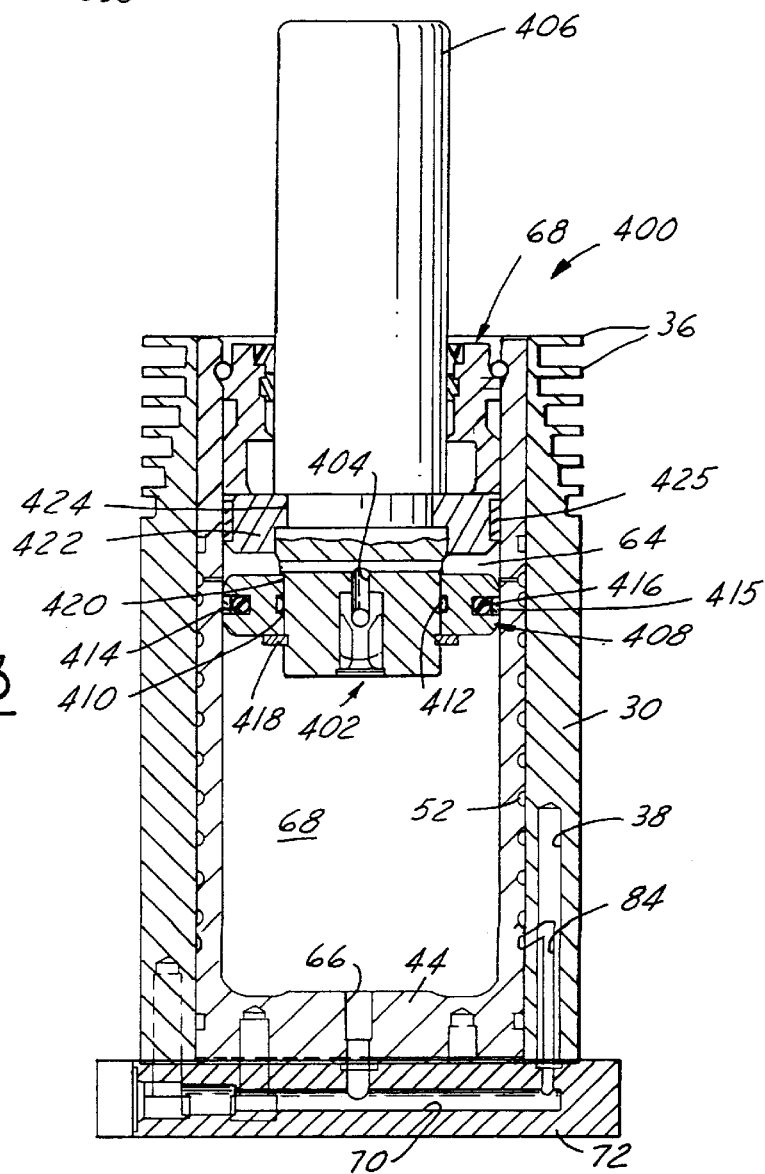
FIG. 13 is a fragmentary sectional view of another modified gas spring embodying the present invention.

As shown in FIG. 13, a fifth embodiment gas spring 400 has a check valve 402 in a passage 404 formed in its piston rod 406 and open to the first gas chamber 64. A piston 408 is formed from a ring and has an inner circumferential groove 410 which receives a seal 412 against the piston rod 406 and an outer circumferential groove 414 which receives a slip ring 415 and seal 416 against the cylinder body 32. The piston 408 is retained on the piston rod 406 by a retaining ring 418 carried by the piston rod 406 and a circumferential shoulder 420 of the piston rod 406. A split retainer 422 partially received in a groove 424 in the piston rod has a bearing 425 to guide the piston rod movement and retains the piston rod 406 and piston 408 in the cylinder body by engagement with a bearing and seal assembly 68.

The remainder of the gas spring 400 is preferably constructed in the same manner as the first embodiment gas spring 10, with like parts given the same reference numbers. Hence, the construction and operation of the gas spring 400 will not be further described.

Desirably, the gas spring 400 may be easier to manufacture than the gas spring 10 as the piston 408 is of relatively simple design. Also, the passage 404, shoulder 420, and groove 424 may be readily formed in the piston rod 406.

Sixth Embodiment

Figure 14:
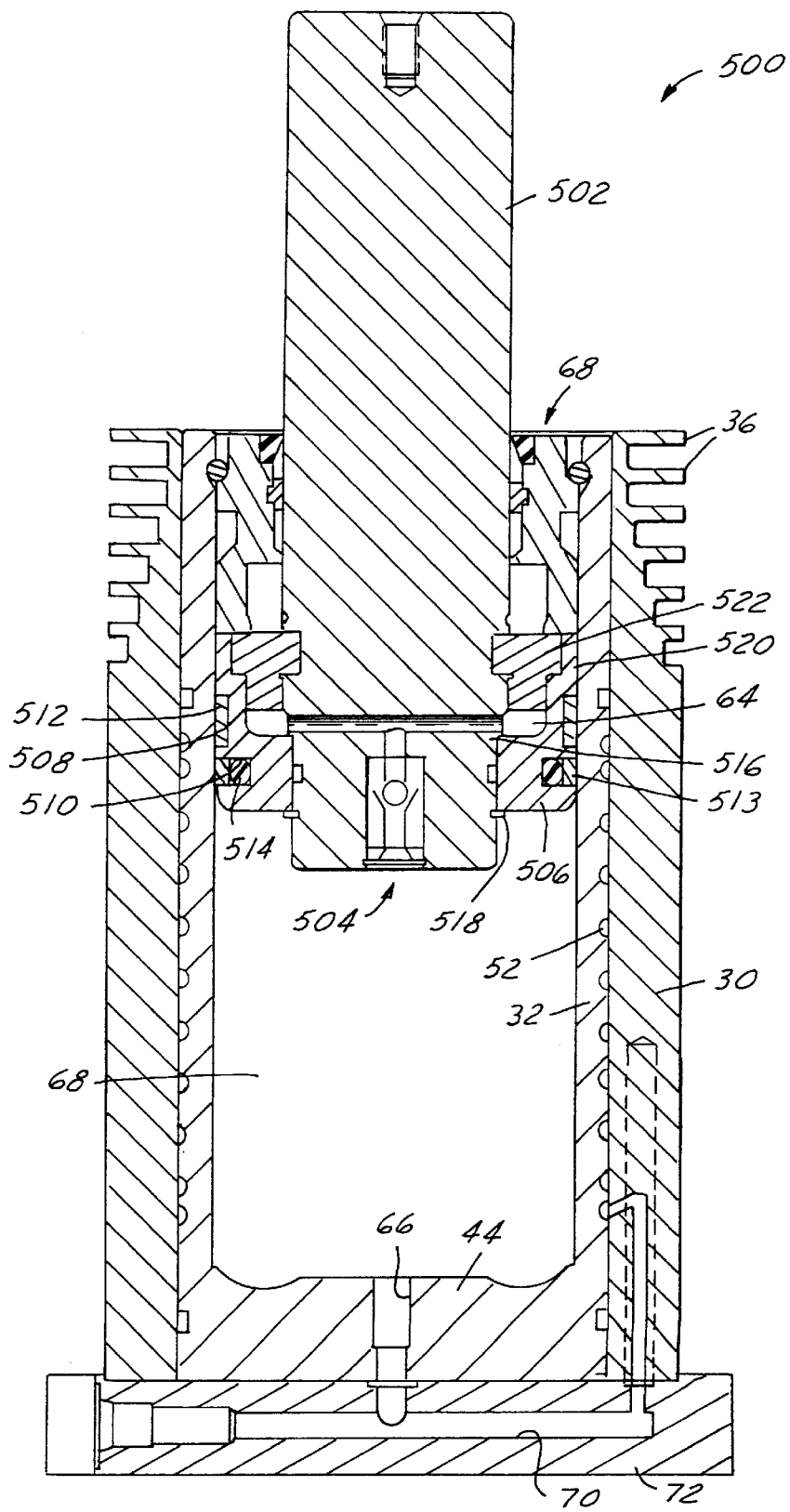
FIG. 14 is a fragmentary sectional view of another modified gas spring embodying the present invention.

As shown in FIG. 14, a sixth embodiment gas spring 500 has a piston rod 502 and check valve 504 arrangement which is preferably the same as the piston rod 406 and check valve 402 of the fifth embodiment gas spring 400. A piston 506 has outer slots 508, 510 which carry a guide 512 and a slip ring 513 and seal 514, respectively. The piston 506 surrounds the piston rod 502 and is retained between a piston rod shoulder 516 and a retaining ring 518. A sidewall 520 of the piston 506 surrounds and abuts a retaining ring 522 received on the piston rod 502 to retain the piston rod 502 and piston 506 in the cylinder body 32 as in the previous embodiments.

In this embodiment, orifice 62 is closed or sealed when the piston rod 502 is in its extended position, such as by the piston guide 512 as shown in FIG. 14, to maintain some pressurized gas in the first gas chamber 64. The pressurized gas in the first gas chamber 64 resists initial opening of the check valve 504 as the piston rod 502 is displaced toward its retracted position to reduce the impact strike or initial force on the gas spring. After a short interval of travel of the piston rod 502 toward its retracted position, the pressure in the second gas chamber 68 will increase to open the check valve 504. Once the check valve 504 is open, the gas spring 500 will function in the same manner as the first embodiment gas spring 10.

The cylinder body 32, shell 30, bearing and seal assembly 68, and mounting plate 72 are preferably constructed as in the first embodiment gas spring 10. Hence, the construction of the gas spring 500 will not be further described.

In either embodiment, the gas spring 10, 10', 200, 300, 400, 500 provides a controlled transfer of compressed gas between its first and second gas chambers 64, 68 or 320, 324 to provide a controlled rate of return of the piston rod assembly 34, 34' from its retracted to its extended position. Notably, no electronic or manual controls are needed nor is hydraulic fluid or other liquid used to provide a delayed return. Rather, the gas spring 10, 10', 200, 300, 400, 500 may be self-contained and uses only compressed gas to control the rate of return of the piston and rod assembly 34, 34'. Desirably, the gas spring 10, 10', 200, 300, 400, 500 is provided with numerous heat transfer features to improve the dissipation of heat from the gas spring 10, 10', 200, 300, 400, 500 to improve its efficiency, prevent it from overheating and increase its maximum cycle rate.

What is claimed is:

1. A gas spring, comprising:

a body having a bore;

a piston rod assembly having a piston and a piston rod slidably received in the bore for reciprocation between retracted and extended positions and defining a first gas chamber and a second gas chamber both constructed to receive a gas under pressure;

a first passage communicating the first gas chamber with the second gas chamber and having at least a portion sized to provide a restricted flow rate of gas therethrough;

a second passage communicating the first gas chamber with the second gas chamber; and a valve in the second passage to control the flow of gas through the second passage and constructed and arranged so that upon movement of the piston rod assembly toward its retracted position, the volume of the second gas chamber is decreased and the valve permits gas in the second gas chamber to flow through the second passage and into the first gas chamber and upon movement of the piston rod assembly toward its extended position, the volume of the first gas chamber is decreased, the valve at least substantially prevents gas flow through the second passage and the flow rate of gas from the first gas chamber to the second gas chamber through the first passage is controlled by the portion that restricts flow to control the flow rate of gas out of the first gas chamber and thereby control the rate at which the piston rod assembly moves towards its extended position.

2. The gas spring of claim 1 wherein the second passage is formed through the piston and the valve is carried by the piston.

3. The gas spring of claim 2 wherein the valve prevents the flow of gas from the first gas chamber to the second gas chamber.

4. The gas spring of claim 2 wherein the valve has a valve seat and a valve head engageable with the valve seat to control the flow rate of gas through the second passage and a bore formed through the valve head defines the first passage through which a restricted flow rate of gas may flow even when the valve head is engaged with the valve seat.

5. The gas spring of claim 1 which also comprises a shell surrounding the body and wherein the first passage is defined at least in part between the shell and the body.

6. The gas spring of claim 5 wherein the shell is formed of a material having high thermal conductivity and the first passage is somewhat circuitous to increase the heat transfer from gas in the first passage to the shell.

7. The gas spring of claim 1 wherein both the first gas chamber and the second gas chamber are constructed to contain a pressurized, inert gas.

8. The gas spring of claim 1 which also comprises a reservoir spaced from the body, in communication with the first passage through a conduit and constructed to contain a supply of pressurized fluid to be exchanged with at least some of the gas in one of the first gas chamber and second gas chamber to increase the heat transfer from the gas spring.

9. The gas spring of claim 5 which also comprises a base plate on which the body and shell are mounted with the first passage defined at least in part in the base plate.

10. The gas spring of claim 5 wherein the body is formed of steel and the shell is formed of aluminum.

11. The gas spring of claim 5 wherein the first passage is defined at least in part by a helical groove formed in the body.

12. The gas spring of claim 1 wherein the second passage is formed in the piston rod.

13. The gas spring of claim 1 wherein the first passage is formed through the piston.

14. The gas spring of claim 5 wherein the shell has a plurality of blind bores and a heat pipe received in each bore to increase heat transfer away from the gas spring.

15. The gas spring of claim 1 which also comprises a surge tank having a body defining a chamber constructed to contain gas under pressure and in communication with the second gas chamber to receive compressed gas from and provide compressed gas to the second gas chamber to facilitate cooling the gas and gas spring.

16. The gas spring of claim 15 which also comprises a control valve disposed between the second gas chamber and surge tank chamber and constructed to permit a relatively free flow of gas from the second gas chamber to the surge tank chamber and to permit a restricted flow of gas in the opposite direction.

17. The gas spring of claim 15 wherein the surge tank body is formed of a material having high thermal conductivity.

18. The gas spring of claim 1 wherein the piston prevents fluid flow through the first passage when the piston rod assembly is in its extended position.

19. A gas spring, comprising:
   a body having a bore and a fluid passage with a restriction constructed to permit a controlled fluid flow through the fluid passage;
   a piston slidably received in the bore for reciprocation between retracted and extended positions and defining a first gas chamber and a second gas chamber in communication with the first gas chamber through the fluid passage and restriction, and a passage through the piston open at one end to the first gas chamber and open at its other end to the second gas chamber;
   a seal between the piston and body to substantially prevent fluid flow between them; and
   a valve carried by the piston to selectively permit fluid flow through the passage of the piston and constructed and arranged so that upon movement of the piston toward its retracted position, the valve permits fluid in the second gas chamber to flow through the passage in the piston and into the first gas chamber and upon movement of the piston toward its extended position, the valve prevents fluid flow from the first gas chamber to the second gas chamber through the passage in the piston and fluid may be transferred from the first gas chamber to the second gas chamber through the fluid passage and restriction to control the release of pressurized fluid from the first gas chamber to thereby control the rate at which the piston moves towards its extended position.

\* \* \* \* \*